April 17, 1962 H. W. WILSON ETAL 3,030,081
PROCESS FOR BLENDING MOLDING POWDERS
Filed Feb. 9, 1960
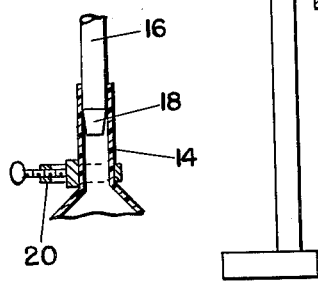
Fig. 1
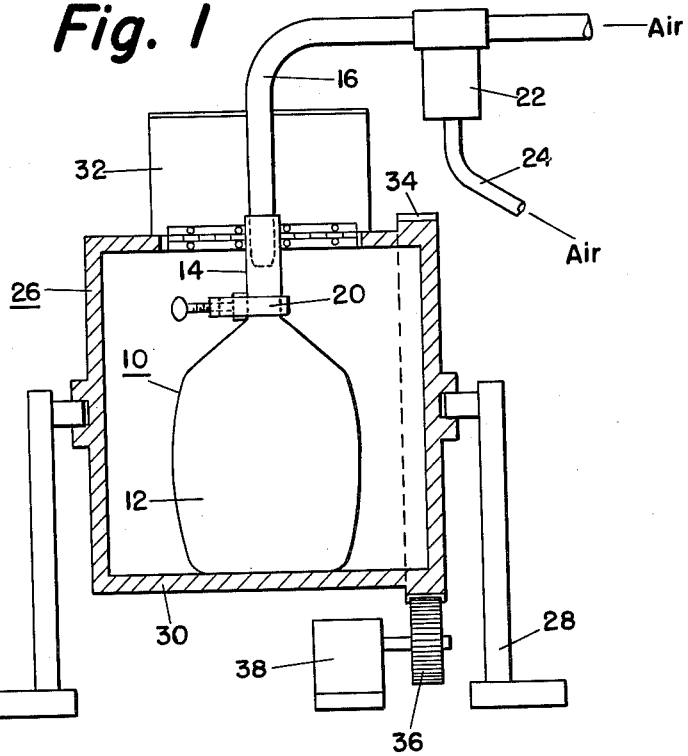
Fig. 2
Fig. 3
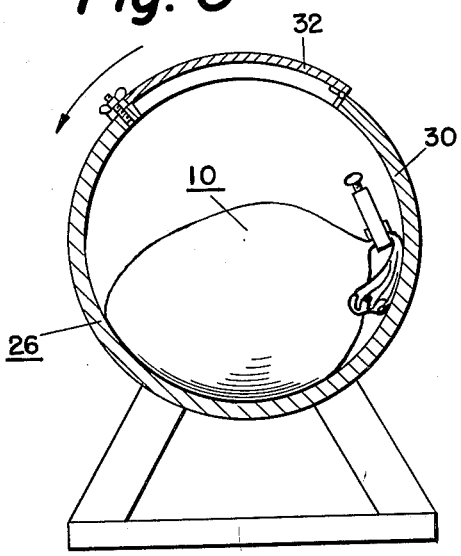
Fig. 4
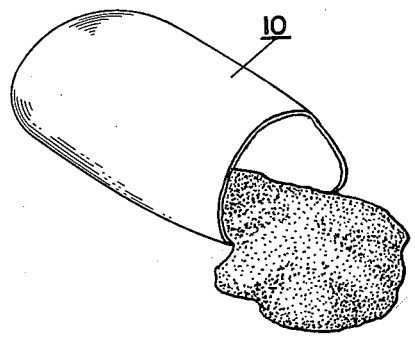
INVENTORS
HARRY W. WILSON
LEON LAUTIN
BY
Arthur H. Seidel
ATTORNEY

United States Patent Office 3,030,081
Patented Apr. 17, 1962

3,030,081
PROCESS FOR BLENDING MOLDING POWDERS
Harry W. Wilson, Garden City, and Leon Lautin, Cedarhurst, N.Y., assignors to Wilson Mold & Die Corporation, Mineola, N.Y., a corporation of New York
Filed Feb. 9, 1960, Ser. No. 7,634
1 Claim. (Cl. 259—72)

The present invention is directed to a process, and apparatus for blending molding powders and to a package unit therefor, and more particularly to the field of the dry blending of pigment and molding powders.

The dry blending of molding powders and pigment powders has long proved to be a serious problem. Thus, such powders are of very fine particle size, and the cleaning of equipment which has been contacted with such powders is must difficult. Since the same blending machine may be utilized to blend a wide variety of different colors, and different plastic types, absolute cleanliness and freedom from contamination is desirable. Thus, the presence of trace amounts of pigment and plastic powders from prior blends will result in off-color blends and other problems.

Furthermore, the cleaning of dry blending equipment is a tedious and time consuming problem. Fine powders are difficult to remove, and tend to cling to surfaces, particularly where there is the slightest undulation in a surface.

The process for blending molding powders comprising adding such powders to a flexible bag, sealing said flexible bag against leakage, and tumbling the sealed bag to effect blending of the powders therewithin was invented by Mr. Leon Lautin, and comprises one of the most effective methods for dry blending molding powders yet developed. However, difficulties have been experienced with this method in that there is a tendency for the bag to collapse during tumbling so that it interferes with the efficient blending of its powder inventory. Moreover, the tumbling of the bag in certain situations, for reasons not understood by us, is not completely satisfactory.

This invention has as an object the provision of a novel process for blending molding powders.

This invention has as another object the provision of a process for blending molding powders in which contamination of the blending apparatus by the powders being blended is avoided.

This invention has as yet another object the provision of a process for blending molding powders in which cleaning of the blending equipment is eliminated.

This invention has as still another object the provision of a process for blending molding powders in which quantitative recovery of the finished blend after blending is achieved.

This invention has as another object the provision of apparatus for blending molding powders in which rapid and dustless charging of the blended powders is achieved.

This invention has as a further object the provision of a package unit in which molding powders and pigment may be blended and stored.

Other objects will appear hereinafter.

For the purpose of illustrating the invention there is shown in the drawings a form which is presently preferred; it being understood, however, that this invention is not limited to the precise arrangements and instrumentalities shown.

Referring to the drawings, which are diagrammatic, and diagrammatically illustrate the subject invention:

FIGURE 1 is a vertical sectional view revealing the loading of the plastic bag used in the present invention with pigment powder and with plastic monomer powder.

FIGURE 2 is a vertical sectional view revealing the engagement between the plastic bag and the color loading apparatus.

FIGURE 3 is a diagrammatic view revealing the tumbling of the pigment and plastic powders within the plastic bag.

FIGURE 4 is a diagrammatic view revealing the removal of the blended pigment and plastic powders from the plastic bag.

The subject invention is applicable to any of the wide variety of plastic powders which are dry blended with pigment powders prior to molding. A large number of plastic materials are presently dry-blended, and it is to be understood that the subject invention is broadly applicable to any of them.

The loading of the plastic bag 10 with plastic monomer powder and pigment powder is illustrated in FIGURES 1 and 2. The plastic bag 10 of the present invention preferably comprises a body 12, and a tubular neck 14. Both the body 12 and tubular neck 14 of the bag 10 should possess sufficient strength so as to withstand tumbling when the bag 10 is distended.

The plastic powder, which comprises plastic monomer powder, may be loaded into the bag 10 by a variety of techniques. One such technique is to load the bag 10 by slipping the tubular neck 14 over a mating male tubular member from a discharge hopper and loading the plastic bag 10 with the powder discharge from such hopper. Alternatively, the plastic bag 10 may be pneumatically loaded with the plastic monomer powder.

A wide variety of ratios of plastic powder to pigment may be utilized, as will be readily understood by one having skill in the art. In the illustrated example, the plastic monomer powder comprises polyethylene powder, and the pigment powder comprises titanium dioxide, which is a pigment which produces a white plastic in the finished blend and/or molded product. The plastic bag 10 may likewise be formed of polyethylene for the reasons set forth below. A suitable weight ratio for the subject example is a ratio of fifty pounds of polyethylene powder to one-half pound of titanium dioxide pigment powder.

The pigment powder is preferably charged to the bag 10 after the bag 10 has been filled with the plastic monomer powder. The apparatus for charging the bag 10 with pigment powder and distending the bag 10, shown in FIGURES 1 and 2 is as follows:

The pneumatic duct 16 is provided with a nozzle 18. The nozzle 18 facilitates the slipping on of the tubular neck 14 of plastic bag 10, as shown in FIGURE 2. The tubular neck 14 (as well as the body 12) of plastic bag 10 is resilient, and is somewhat enlarged when slipped over the nozzle 18. This enables a gas-tight fit to be secured between the plastic bag 10 and the pneumatic duct 16. A pinch clamp 20 which may be selectively opened or closed is carried on the tubular neck 14 below the nozzle 18. During the loading of the pigment powder into the bag 10, the pinch clamp 20 is in its open disposition.

The pigment powder is fed into the pneumatic duct 16 from its container 22. This is preferably accomplished by piercing both the top and bottom of the container 22 and pushing pigment powder therefrom by means of air introduced into the container 22 through duct 24. The pigment powder from container 22 is picked up in the air stream within pneumatic duct 16 and is rapidly carried into the plastic bag 10. The gas pressure within the pneumatic duct 16 is sufficient to distend the plastic bag 10 but is not sufficient to burst it.

When the charge of pigment powder is introduced into the bag 10, the pinch clamp 20 is closed by tightening it on the tubular neck 14, and the plastic bag 10 is removed from the pneumatic duct 16 by slipping the end of the tubular neck 14 from the nozzle 18 of the pneumatic duct 16. The bag 10 is in a distended disposition, since the air pressure within it is somewhat greater than atmospheric pressure. The pinch clamp 20 effects a positive seal on the plastic bag 10 preventing any leakage of any of the powders from the plastic bag 10 and any leakage of the air contents from the plastic bag 10.

The sealed plastic bag 10 is then tumbled within the tumbling machine designated generally as 26. A wide variety of tumbling machines may be utilized, and the showing in the drawings is to be taken as merely diagrammatic. However, as shown therein the tumbling machine 26 comprises the frame 28 on which is rotatably mounted the barrel 30 having the cover 32 at its side. The plastic bag 10 is introduced into the barrel 30 through the cover 32. The barrel 30 is provided on its exterior with gear teeth 34 which engage the pinion 36 which is driven by the motor 38.

Tumbling of the plastic bag 10 within the barrel 30 is continued for a sufficient time period to effect complete blending of the plastic monomer powder and pigment powder within the plastic bag 10. In view of the distended condition of the plastic bag 10, there is substantially no interference on the part of the plastic bag 10 with the tumbling of its powder inentory. Thus, tumbling of a given powder inventory may be achieved in accordance with the present invention in substantially the same time as would be the case were the tumbling effected directly within the barrel 30. It is to be emphasized that since all of the blending is accomplished within the plastic bag 10, there is no contact and hence no contamination arising between the powder inventory being tumbled and the interior surface of the barrel 30.

When the powder inventory has been blended, the same may be removed from the plastic bag 10, and utilized as the charge to a molding press or the like. Thus, the pinch clamp 20 may be opened, and if desired the powder inventory may be poured from the plastic bag 10 through its tubular neck 14. However, a more rapid way of discharging the contents of the plastic bag 10 is shown in FIGURE 4. This consists of snipping off the tubular neck 14 in the shoulder portion of the body 12, and then discharging the contents through the relatively large opening.

The removal of the powders from the plastic bag 10 is conventionally done when the chemical composition of the plastic bag 10 differs from that of the plastic powders which have been blended. However, when the chemical composition of the plastic bag 10 is the same as that of the plastic monomer which has been blended, it is not necessary in a preferred embodiment of the present invention to separate the blended plastic and pigment powders from the bag 10. Thus, where there is a minor amount of blending at some stage subsequent to the initial blending, then both the plastic bag 10 and the blended powders may be directly added to the molding machine. Such molding machine may be provided with means (not shown) to grind up the bag and effect rough blending of the ground up portions thereof.

The process of the present invention eliminates the necessity for cleaning the interior of the barrel 30, and eliminates the contamination of the interior of the barrel 30 with powders from a prior blend.

The present invention may be embodied in other specific forms without departing from the spirit or essential attributes thereof and, accordingly, reference should be made to the appended claim, rather than to the foregoing specification as indicating the scope of the invention.

It is claimed:

The process for dry blending a plurality of powders which comprises adding such powders to a flexible bag, distending said bag by the introduction of a superatmospheric gaseous pressure therewithin, operatively gastightly sealing said bag, and tumbling said sealed distended bag to effect blending of the powders.

References Cited in the file of this patent

UNITED STATES PATENTS

| | | |
|---|---|---|
| 2,133,584 | Spanel | Oct. 18, 1938 |
| 2,617,775 | Newberg et al. | Nov. 11, 1952 |
| 2,617,782 | Paton et al. | Nov. 11, 1952 |
| 2,625,893 | Semple | Jan. 20, 1953 |
| 2,912,803 | Simjian | Nov. 17, 1959 |